T. B. DIXON.
TELEGRAPHY.
APPLICATION FILED JULY 29, 1916.

1,339,550.

Patented May 11, 1920.
3 SHEETS—SHEET 1.

WITNESSES:
G. H. Ridge.
J. J. Offering

INVENTOR.
Thomas Bullitt Dixon

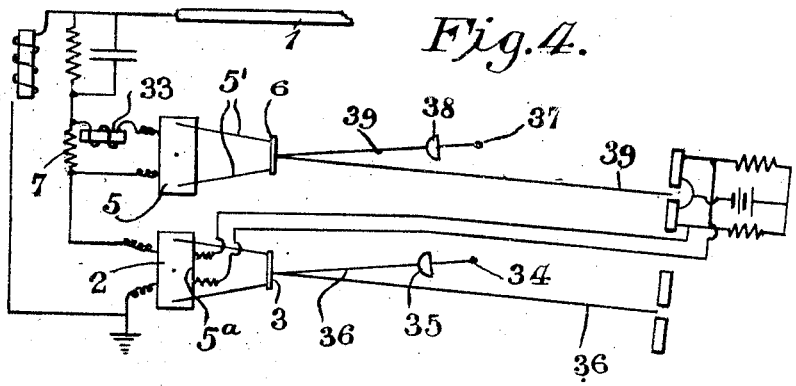
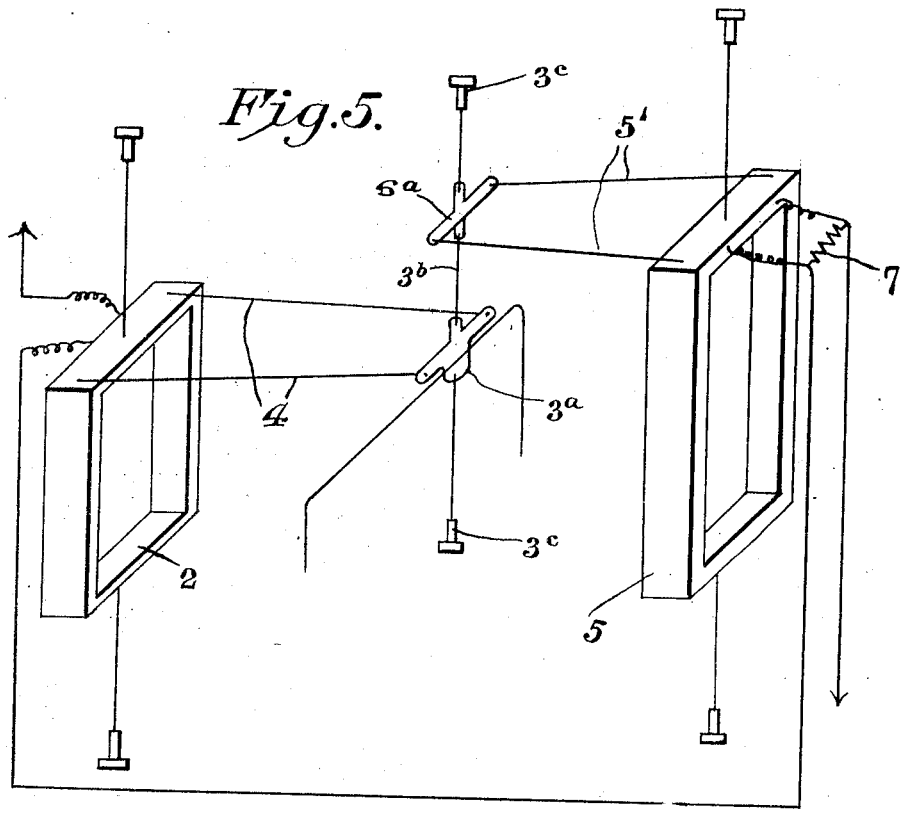

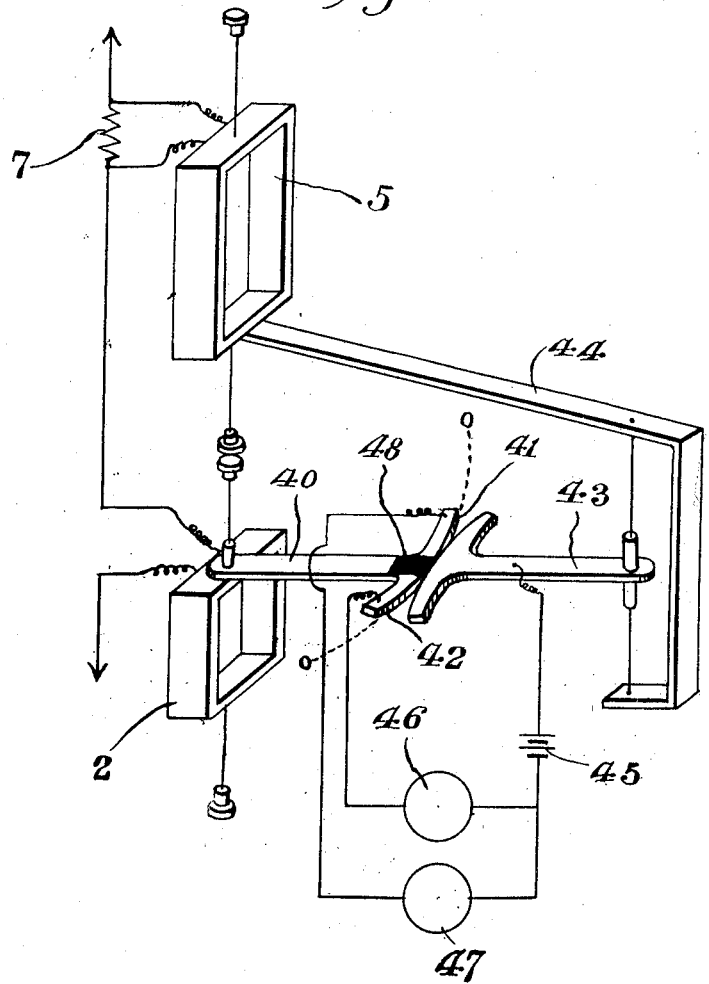

UNITED STATES PATENT OFFICE.

THOMAS BULLITT DIXON, OF NEW YORK, N. Y.

TELEGRAPHY.

1,339,550.    Specification of Letters Patent.    Patented May 11, 1920.

Application filed July 29, 1916. Serial No. 112,055.

*To all whom it may concern:*

Be it known that I, THOMAS BULLITT DIXON, a citizen of the United States of America, and a resident of New York city, county and State of New York, have invented new and useful Improvements in Telegraphy, of which the following is a specification.

My invention relates to telegraph and like signaling systems, and particularly to submarine cable telegraph systems, and comprises means whereby what is known as zero displacement, or " no man's land " displacement, is automatically corrected.

In cable circuits displacement of the zero or " no man's land " of the signal receiving instruments is most commonly caused by earth currents, which usually appear as electrical waves or surges of low time period as compared with the time period of the current pulsations employed in signaling, and I have discovered that this fact makes it possible to employ means actuated by the earth currents themselves to automatically correct zero-displacement effects in the receiving instruments otherwise caused by the earth currents. The detrimental effects of zero displacements are well known, it often happening that during periods of earth current disturbances cable working is seriously interfered with and sometimes stopped entirely because of the impracticability of maintaining the receiving instruments in workable adjustment. In the normal operation of cable instruments such as the siphon recorder, relays, amplifiers, reflecting galvanometers etc. the movable arm, whatever its character, controlled by the signal reproducing element, in responding to the signaling current pulsations in the cable circuit, is deflected to one side of a normal central position, termed the zero or " no man's land " position of the instrument, for dots off the customary cable code and to the opposite side for dashes. The space on the two sides of zero within which signaling deflections occur may be termed the signaling zone of the instrument, and when the zero becomes displaced the signaling zone becomes displaced correspondingly, the effect of this in the siphon recorder being to sometimes impair the quality and legibility of the signals and sometimes to cause the siphon to leave the paper recording slip; and in relays the effect is equally detrimental if not more so since the contact arm is given a bias on one side or the other which often causes the signals to become so distorted as to be unreadable. The effect of earth currents on amplifiers and the instruments operated by them is, in general, much the same as that just referred to in connection with siphon recorders and relays.

While my hereindescribed invention is applicable to all types of cable receiving instruments, in the accompanying drawings I have shown it as applied to a reflecting galvanometer, to signal amplifying systems actuated by reflecting galvanometers, to a siphon recorder, and a relay, these illustrations being sufficient to fully set forth the character and scope of my invention.

My invention comprises a primary signaling element, preferably a coil, and a correction element, also preferably a coil. The two coils are in some cases placed in the main cable circuit, but in certain cases the correction coil may be placed in a local circuit controlled by the signaling coil in the main circuit; and in some cases I may employ either of the foregoing arrangements and in addition an instrument in the local circuit having both a signaling and correction coil. In the following description of my invention and in the claims I shall refer to the signaling and correction elements as the signaling coil and correction coil. The correction coil may be employed in several distinct ways to perform its function: It may be arranged to correct the effects of zero displacement in the signaling coil without influencing the movements of the signaling coil itself; it may be arranged to correct zero displacement by influencing the movements of the signaling coil which otherwise cause displacement; or it may be arranged to correct the effects of zero displacement by actuating a traveling " no man's land." My invention comprises other features hereinafter set forth.

In the accompanying drawings I illustrate more or less diagrammatically various arrangements embodying my said invention.

In said drawings:

Fig. 4 is a diagram showing an alternative manner of applying my invention in connection with a reflecting galvanometer.

Fig. 5 is a diagrammatic-perspective view showing my invention as applied to siphon recorders etc.

Fig. 6 is a diagrammatic-perspective view showing my invention as applied to a relay.

Figure 1:
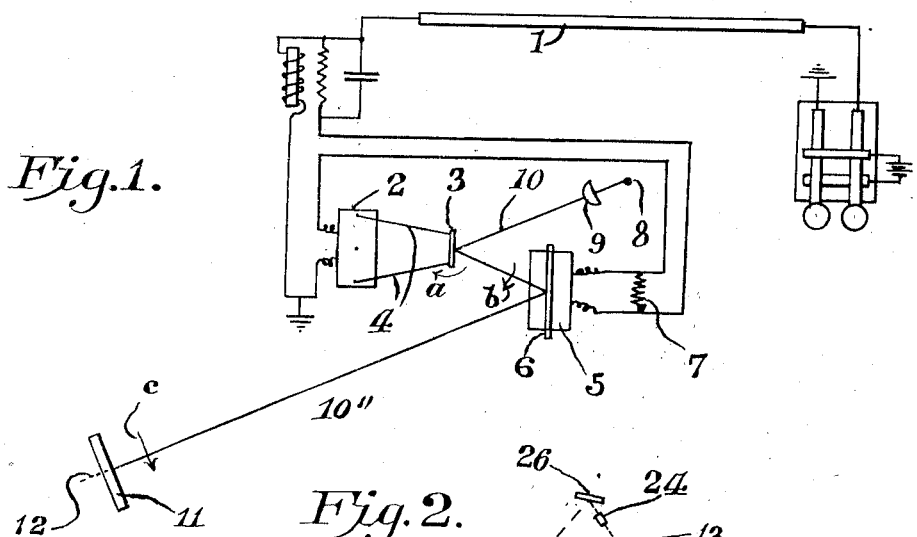
Figure 1 is a diagram showing my invention applied in connection with a reflecting galvanometer.

Referring first to Fig. 1: 1 is a cable circuit, the usual transmitting keys and battery being shown at the right of the diagram and the usual shunted receiving condenser and magnetic shunt at the left. 2 is the coil of a signaling reflecting galvanometer placed in the cable circuit, 3 the galvanometer mirror, 4 fibers connecting coil with mirror, 5 a second reflecting galvanometer coil also placed in the cable circuit and carrying a mirror 6. Coil 5 is shunted by a resistance 7 of relatively low value, so that a very small portion of current flows through coil, this coil 5 being the correction coil, and it is preferably wound upon a metal bobbin to increase the damping effect, a construction well known and employed generally in reflecting galvanometers and other deadbeat instruments. The coil 2 is preferably a simple wire coil made as signaling coils are usually made, the wire being held in form by some suitable cement.

I have found that two coils such as those just referred to may be placed in a signaling circuit and that with proper values for the coil windings and the shunt 7 coil 5 will have no appreciable movement for signaling currents but will respond to currents of low period, such as earth currents, while the movements of coil 2, in response to signaling currents, are not appreciably reduced in amplitude as a result of the two coils being placed in the same circuit; coil 2 also responds to currents of low period. Both coils have the usual torsional suspensions and are placed so as to be rotatable within certain limits in a magnetic field (not shown). 8 is a source of light, 9 a concentration lens, 10 a light beam from the source 8 passing through the lens 9 to the reflector 3, 10' a portion of the beam, and 10" another portion, the beam 10 being incident on reflector 3, reflected therefrom as 10' and incident on reflector 6 from which it is again reflected as 10" to an element 11, the center of which represents the true or absolute zero of the instrument, and is indicated by the dotted line 12. The element 11 may be a screen, a radio-electro-sensitive device of any desired character, or any other device required. The coils 2 and 5 are so connected in the circuit that when both turn on their axes simultaneously the mirror 6 turns in a direction to influence the position of the light beam 10" at the zero point 12 so that deflection of the beam as a result of the movement of coil 2 and mirror 3 is neutralized and prevented. For example, if mirror 3 turns in the direction of dart $a$ at a time when mirror 6 is stationary the portion of beam 10' will move in direction of dart $b$ and the portion 10" will move in direction of dart $c$ as a result of the enlargement of the angle formed by 10' and 10". If, however, mirror 6 at the same instant turns in a direction to reduce the said angle to a proper degree corresponding to the enlargement otherwise caused by the movement of mirror 3, the beam at the zero point 12 will not be caused to move. It will thus be seen that while the coil 2 and mirror 3 are responding to signaling currents alone, there being no earth current influencing the coil, the light beam in its motion to and from zero on either side thereof will not have its angle affected by the mirror 6, which for practical purposes may be considered as stationary under these conditions; but as soon as an earth current causes a zero displacement of coil 2 and of the light beam, in so far as it is controlled by mirror 3 alone, the displacement as it respects the light beam is at once corrected by the movement in response to the earth current of coil 5 and its mirror 6, as above described. While the signaling mirror 3 should be as small and light as possible the mirror 5, because of its relatively slow movements may be as large as required to permit the movements of light beam over its reflecting surface without exceeding the limits thereof.

Figure 2:
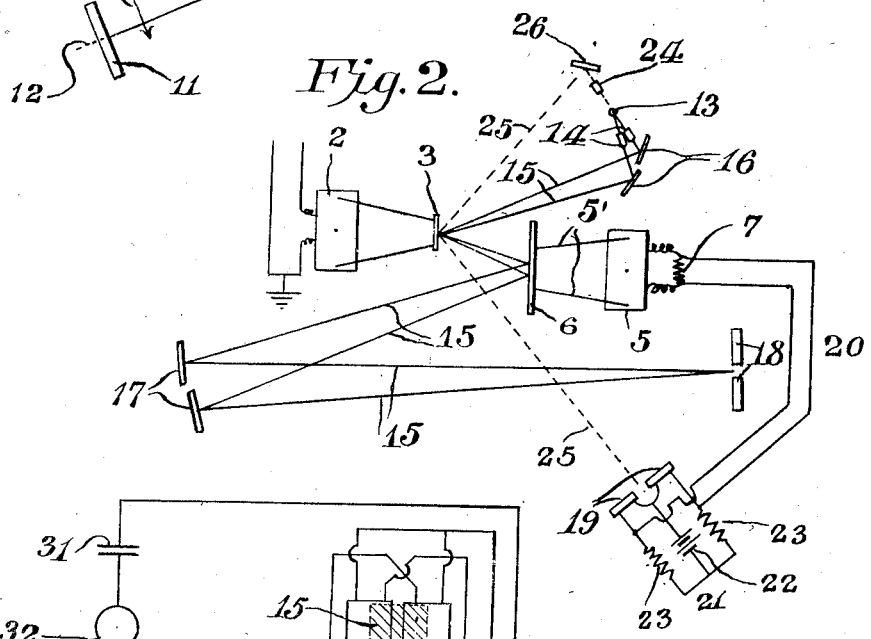
Fig. 2 shows diagrammatically an application of my invention in connection with a radio-electric amplifier of my invention.

Referring now to Fig. 2, in this figure I illustrate one arrangement for zero correction in which the correction coil is placed in a local circuit influenced by the current variations occurring in the main circuit and reproducing corresponding variations locally. In this figure I also show an arrangement comprising a plurality of light beams reflected at different angles from the signaling reflector, some of which are signaling beams and the remainder correction beams, in the figure only one correction beam being shown. The signaling and correction beams may be projected at different angles on to the mirror 3 by means of any suitable optical arrangement, but I prefer to employ an arrangement whereby the beams are all derived from a single source of light, such as illustrated in my application for Letters Patent for the United States, Serial No. 40,694, filed July 19, 1915, for a "method of and apparatus for transforming motion into electrical waves or impulses", now Patent No. 1,193,999, dated August 8th, 1916. In the said Letters Patent I have illustrated, described and claimed means for transforming motion into electrical waves through the action of a plurality of light beams projected convergently on to a primary actuating device reflector,— an equivalent of the signaling mirror referred to herein,— reflected divergently therefrom and then again reflected convergently on to a selenium cell or cells or other radio-electro-sensitive element or elements. Referring again to the figure, 13 is a source of light, 14 a group of sectional condensing lenses through which pass light beams 15. 16 are a group of reflectors placed in the paths of beams 15 at proper angles to cause them to converge after reflection on to mirror 3 from which they are reflected at divergent angles on to mirror 6, thence to secondary reflectors 17 from which they are reflected again convergently on to selenium cells 18, the movements of the signaling mirror 3 in response to signals causing the beams to move together over the surface of the selenium cells, and the movements of the correction mirror 5 in response to earth currents and the like preventing zero displacement at the point where the beams coincide in position on the selenium cells, the correction coil and mirror being here controlled by the circuit of correction selenium cells 19, the coil being placed in a crosswire 20 of a Wheatstone bridge 21 which comprises a battery 22, balancing resistances 23 in two arms and selenium cells 19 in the remaining two arms. 24 is a sectional condensing lens, 25 a correction light beam (here shown in dotted lines to better distinguish it from the signaling beams), 26 a reflector for causing the beam to be projected at a proper angle on to mirror 3, from which it is reflected to selenium cells 19. It will be seen that the correction beam does not impinge on the mirror 6 but passes directly to the selenium cells 19. The cells may be either set apart so that the beam is between them normally when in the absolute zero position or they may be near together so that the beam is partly on each cell. The sharp movements of the beam 25 in response to signals as well as the slow movements in response to earth currents are transformed into corresponding electrical variations in the selenium cells which cause current variations in crosswire 20, the variations due to signals not affecting correction coil 5, but the variations of low period caused by earth currents affecting it in the same manner as above described in connection with Fig. 1, so that the same correcting influence is exercised by mirror 6 with respect to beams 15 as when coil 5 is placed directly in the main cable circuit. In this arrangement I have shown the correction coil and mirror connected by fibers 5' instead of mounting the mirror directly on the coil, as shown in Fig. 1. It will be obvious that the arrangement of signaling beams shown in Fig. 2 may be also employed where the correction coil is placed in the main circuit, as in Fig. 1.

Figure 3:
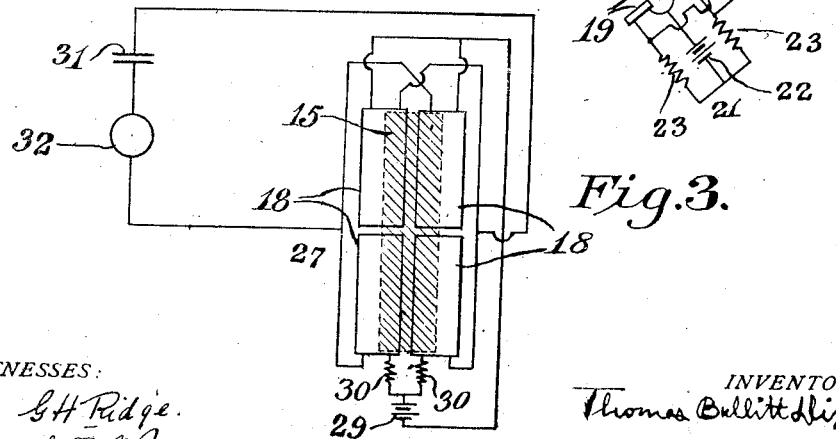
Fig. 3 is a diagram showing an arrangement of local circuits employed in said amplifier.

In Fig. 3 I show an arrangement of selenium cells 18 and circuits therefor that I prefer to use in connection with my said apparatus for transforming motion into electrical waves where this apparatus is employed for the purpose of amplifying the signals sent over a submarine cable, and particularly where such amplified signals are utilized to operate certain types of cable relays, additional zero correction means being provided in the form of a condenser placed in series with the coil of the relay or other instrument operated by the said amplified signals. 27 is a Wheatstone bridge having selenium cells 18 placed in each arm thereof and so arranged that to and fro movements of the light beams 15, shown here in cross section, (the axes only of light beams being indicated in other figures,) cause corresponding electrical variations in the cross wire of the bridge, this cross wire circuit being indicated by numeral 28. 29 is a battery supplying current for the bridge, and 30 are resistances for compensating for any difference in the resistances of the cells 18, it being difficult to always procure several cells having exactly the same resistances. 31 is a condenser, above referred to, and 32 the coil of the receiving instrument. The cells 18, as shown, are so placed that the light beams 15 are partly on each cell, but in some cases it may be desirable to set the cells of the left hand and right hand groups such a distance apart that the beams 15 will normally rest in a "no man's land" position between the two groups of cells, so that normally the cells will not be partially illuminated. The condenser 31 serves to prevent slight zero displacements of the instrument 32 which may result, where the condenser is not employed, from certain local causes, such, for example, as variation in intensity of the light source taken together with inequalities in resistance and inertia of the selenium cells 18; and serves further to prevent slight zero displacements which might result from an insufficiently perfect adjustment of the other correction means hereinbefore described.

In Fig. 4 I show an alternative arrangement for placing a correction coil in a local instead of in the main circuit, the signaling coil as here shown being provided with an auxiliary winding, the correction being performed through the influence of current in the local circuit on this auxiliary winding, this auxiliary winding being, in fact, a secondary correction coil actuated through current variations in the local circuit caused by movements of the main or primary correction coil, which, as in Fig. 1, is placed in the main cable circuit. In this arrangement I have also shown an inductance 33 in series with the main correction coil 5 to further increase the damping effect. I have indicated the auxiliary correction winding by 5ª, this winding being in the crosswire circuit of a Wheatstone bridge similar to that described in connection with Fig. 2. 34 is a source of light, 35 a condensing lens, and 36 a signaling light beam actuated by movements of the signaling coil 2 and mirror 3; 37 is a source of light, 38 a condensing lens, and 39 a correction light beam actuated by movements of main correction coil 5 and mirror 6. The circuit connections of secondary correction coil 5ª are such that the effect of current flowing through this coil, as a result of displacement of the zero of correction beam 39 due to an earth current causing coil 5 and mirror 6 to turn on their axes, will be in a direction to oppose and neutralize the effect of such earth current on signaling coil 2, so that no zero displacement of signaling beam 36 will occur.

In Fig. 5 I show one means for connecting the signaling and correction coils together mechanically, both coils being placed in the same circuit, the correction coil being mechanically connected with the suspension of the signaling coil, the correction being performed through variation of the torsion of suspension caused by movements of the correction coil. Fibers 4 of coil 2 connect with a member 3ª, which may carry a siphon, a contact arm, mirror or other device to be actuated by the signaling coil; and fibers 5' connect the correction coil 5 with a member 6ª, the function of which is to influence the torsion of suspension 3ᵇ in response to movements of coil 5. The member 3ª is mounted on the torsional suspension 3ᵇ which is stretched between anchoring screws 3ᶜ. Since the zero position of member 3ª is the resultant of the combined torsional effects of the suspensions of coils 2 and 5 and of suspension 3ᵇ, it follows that if the torsion of suspension 3ᵇ is varied it will correspondingly influence the zero of member 3ª. The circuit connections of correction coil 5 are such that any movement of this coil will tend to give the suspension 3ᵇ a bias in a direction of rotation opposite to that caused by a similar movement of coil 2, so that a zero displacement of member 3ª otherwise caused by movement of coil 2 in response to an earth current is neutralized by the opposing torsional bias of suspension 3ᵇ caused by the corresponding movement of coil 5. It will be obvious that the coil 5 may be wound with a much larger number of turns of wire than coil 2, so that it will have requisite power.

In Fig. 6 I show my invention applied to a relay, the particular form of relay shown being an arrangement of a relay of my invention illustrated, described and claimed in Letters Patent for Great Britain granted me, No. 100,074, dated Feb. 10th, 1916, and in Letters Patent applied for in the United States, France and Germany. Referring now to the figure, 2 is the signaling coil, suspended in the customary manner, 40 an arm carried by said coil, 41 and 42 insulated rolling contact pieces attached to the arm 40, 43 an arm terminating at one end in a rolling contact adapted to make contact with contact pieces 41 and 42 and suspended at the other end, as shown, to an arm 44 carried by correction coil 5. 45 is a battery and 46 and 47 secondary relays, for repeating purposes, as usually employed. Contact arm 43 normally rests against the central insulation section 48 but when contact section 41 or 42 makes contact with arm 43 circuit of battery is established through one of the secondary relays, thus operating it. The circuit connections of the correction coil as here placed are such that in performing its correction in response to low period surges it travels in the same direction as the signaling coil, and since arm 44 and contact arm 43 are carried with it the zero or "no man's land"—here represented by insulation section 48—travels in a path represented by an arc of a circle the center of which is in line with the axis of coils 2 and 5. This curved path is indicated by the dotted line o o, and it will be seen that causing the zero or "no man's land" to travel in correspondence with the zero displacements that would otherwise occur has the same correcting effect as the other means hereinbefore described.

My invention is applicable in many ways other than herein shown and described, and I therefore do not limit myself to the exact arrangements thereof herein illustrated.

What I claim is:—

1. In signal receiving means actuated by a reflecting galvanometer, means for neutralizing zero displacement effects, due to low period electrical surges and variations, on the signaling light beam, which comprises correction means, actuated by the low period surges and variations, for varying the angle of the reflected beam in opposite sense to the angle variation caused by the zero displacing effects of the said surges and variations.

2. In a radio-electric amplifier, the combination comprising a signal receiving coil actuating a signaling reflector, a light beam or beams reflected from said reflector, a correction coil arranged to be actuated by said signal receiving coil, a correction reflector actuated by said correction coil, the said light beam or beams being again reflected by the said correction reflector, the circuit connections of the signal receiving and correction coils being such that the reflectors actuated by them vary the angle or angles of the reflected beam or beams oppositely in response to the effects of low period electrical surges, so that zero displacement of the beam or beams at final impinging point is prevented, and a radio-electro sensitive element or elements arranged to be influenced by said beams or beams, and actuating signal receiving means.

3. In a radio-electric amplifier, the combination comprising a main line signal receiving coil and a signaling reflector actuated thereby, a signaling light beam reflected from said reflector and signal receiving radio-electro-sensitive means influenced by such light beam, a correction light beam reflected from the signaling reflector at a different angle from the signaling beam, correction radio-electro-sensitive means influenced by said correction light beam, an electrical correction circuit influenced by the action of said correction radio-electro-sensitive means, a correction coil in said electrical correction circuit, and a correction reflector actuated by such correction coil, the said correction reflector being placed intermediate the signaling reflector and the signaling radio-electro-sensitive means, the circuit connections of the signal receiving and correction coil being such that zero displacements of the signaling beam at the final impingement point are corrected by the movements of the correction reflector.

4. In a cable relay, means for correcting automatically for zero displacements due to low period electrical surges or current variations, which comprise a signal receiving coil adapted to respond to both signaling currents and low period surges or current variations, signal reproducing means actuated by said receiving coil, a correction coil adapted to respond to low period surges or current variations without materially responding to signaling currents, and means controlled by said correction coil for causing the zero position to travel in correspondence with the zero displacement of the signal receiving coil caused by said low period surges or current variations.

5. In apparatus for receiving and amplifying telegraphic signals, means for automatically correcting zero displacements in the receiving instrument, comprising an unshunted condenser placed in series with the said receiving instrument in the cross wire circuit of a Wheatstone bridge, the arms of said bridge comprising each a selenium cell or equivalent radio-electro-sensitive device actuated by a signaling light beam or beams.

6. In apparatus for receiving and amplifying telegraphic signals, means for automatically correcting zero displacements in the receiving instrument, comprising an unshunted condenser placed in series with the said receiving instrument in a local circuit comprising selenium cells or other radio-electro-sensitive means adapted to produce current variations in correspondence with illumination variation of such radio-electro-sensitive means caused by a primary actuating device actuated by the signaling currents of the main circuit.

7. In a radio-electric relay or amplifier, radio-electric neutralizing means for neutralizing zero displacement effects, due to low period electrical surges, on signal receiving means, said radio-electric neutralizing means being actuated by the low period surges.

In testimony whereof I have signed this specification in the presence of two subscribing witnesses.

THOMAS BULLITT DIXON.

Witnesses:
P. E. OUTERBRIDGE,
E. M. COOKE.